(12) United States Patent
Clark

(10) Patent No.: US 11,731,550 B2
(45) Date of Patent: Aug. 22, 2023

(54) CUP HOLDER ASSEMBLY BRACKET

(71) Applicant: Ford Global Technologies, LLC, Dearborn, MI (US)

(72) Inventor: Scott A. Clark, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 16/837,059

(22) Filed: Apr. 1, 2020

(65) Prior Publication Data
US 2021/0309138 A1  Oct. 7, 2021

(51) Int. Cl.
*B60R 11/02* (2006.01)
*B60N 3/10* (2006.01)
*B60R 11/00* (2006.01)

(52) U.S. Cl.
CPC .............. *B60N 3/105* (2013.01); *B60R 11/00* (2013.01)

(58) Field of Classification Search
CPC ........... B60N 3/105; B60R 11/00; B60R 7/04; B60R 11/0075; F16M 13/02; B69R 2011/0075
See application file for complete search history.

(56) References Cited

U.S. PATENT DOCUMENTS

| | | | | |
|---|---|---|---|---|
| 4,568,117 A * | 2/1986 | McElfish | ............... | B60N 3/102 224/280 |
| 5,102,085 A * | 4/1992 | Wieczorek | ............. | B60N 3/102 224/926 |
| 5,174,534 A * | 12/1992 | Mitchell | ................ | B60N 3/103 215/395 |
| 5,483,808 A * | 1/1996 | Barbazza | ............... | A44C 9/003 63/15.4 |
| 5,862,932 A * | 1/1999 | Walsh | .................. | B65D 21/086 220/8 |
| 6,189,755 B1 * | 2/2001 | Wakefield | .............. | B60N 3/108 224/542 |
| 6,834,838 B2 * | 12/2004 | Dennis | ................... | B60N 3/102 248/311.2 |
| 7,036,700 B2 * | 5/2006 | Engel | ..................... | B60N 3/106 224/501 |
| 7,099,467 B1 * | 8/2006 | Rohrbach | .............. | G09B 15/00 379/441 |
| 7,455,341 B2 * | 11/2008 | Miyashita | .............. | B60N 3/105 296/37.12 |
| 7,513,553 B2 * | 4/2009 | Singh | ...................... | B60N 3/08 296/37.8 |

(Continued)

*Primary Examiner* — Amy J. Sterling
(74) *Attorney, Agent, or Firm* — Vichit Chea; Price Heneveld LLP

(57) ABSTRACT

A cup holder assembly includes a base. A side wall is coupled to the base and extends cup holder assembly-upward from the base to generally define a cavity for receiving a cup. A bracket is pivotably coupled to the base and is operable to pivot between a first position and a second position. A retention feature is coupled to the bracket and is configured to engage with the base if the bracket is in the second position to retain the bracket in the second position. An electronic device is operable between an unassembled position and an assembled position in which the electronic device is engaged with the bracket, wherein the electronic device is configured to move with the bracket as the bracket pivots between the first and second positions if the electronic device is in the assembled position.

18 Claims, 7 Drawing Sheets

(56) References Cited

U.S. PATENT DOCUMENTS

| | | | | |
|---|---|---|---|---|
| 7,611,114 B1* | 11/2009 | Griffin | .................... | A45F 5/00 |
| | | | | 248/311.2 |
| 7,757,888 B2* | 7/2010 | Ogura | .................. | B60N 3/102 |
| | | | | 220/737 |
| 8,042,780 B2* | 10/2011 | Wagner | ................ | B60N 3/102 |
| | | | | 248/311.2 |
| 8,267,271 B2* | 9/2012 | Faris | .................... | B65D 21/08 |
| | | | | 220/8 |
| 8,439,438 B2* | 5/2013 | Oldani | .................. | B60N 3/102 |
| | | | | 297/188.14 |
| 8,474,772 B2* | 7/2013 | Miklas | .................. | B60N 3/107 |
| | | | | 248/286.1 |
| 10,071,691 B2* | 9/2018 | Parlow | .................... | B60R 7/04 |
| 10,113,791 B2 | 10/2018 | Wenji et al. | | |
| 10,155,482 B2* | 12/2018 | Corso | .................. | H04B 1/3877 |
| 10,414,317 B2 | 9/2019 | Hillawi et al. | | |
| 10,442,367 B1* | 10/2019 | Gachuz Navarro | .... | B60R 11/02 |
| 10,576,905 B1* | 3/2020 | MacNeil | .............. | H04B 1/3877 |
| 10,717,396 B2* | 7/2020 | MacNeil | ................ | H04M 1/04 |
| 10,793,081 B2* | 10/2020 | Tena Han | ............... | B60R 11/02 |
| 10,793,083 B1* | 10/2020 | Johns | .................. | B60R 11/0241 |
| 2004/0086112 A1* | 5/2004 | Hilger | ................ | B60R 11/0241 |
| | | | | 379/455 |
| 2011/0095556 A1* | 4/2011 | Werner | ................ | B60N 3/105 |
| | | | | 296/24.34 |
| 2012/0248106 A1* | 10/2012 | Marta | ................ | B65D 21/086 |
| | | | | 220/8 |
| 2018/0361901 A1* | 12/2018 | Cheung | ................ | B60N 3/102 |
| 2020/0180490 A1* | 6/2020 | Benliyan | ............... | B60N 3/105 |
| 2020/0324680 A1* | 10/2020 | Fukui | .................... | B60R 11/02 |
| 2021/0184371 A1* | 6/2021 | Ying | ........................ | H01Q 1/38 |

\* cited by examiner

CUP HOLDER ASSEMBLY BRACKET

FIELD OF THE DISCLOSURE

The present disclosure generally relates to a cup holder assembly bracket. More specifically, the present disclosure relates to a cup holder assembly bracket that is pivotably coupled to a base of the cup holder assembly.

BACKGROUND OF THE DISCLOSURE

Cup holders are typically used to support occupant drinking glasses. A cup holder assembly that includes an electronic component-maintaining bracket pivotably coupled to a base of the cup holder assembly by a living hinge may be desired.

SUMMARY OF THE DISCLOSURE

According to a first aspect of the present disclosure, a cup holder assembly includes a base. A side wall is coupled to the base and extends cup holder assembly-upward from the base to define a cavity. A bracket is pivotably coupled to the base and is operable to pivot between a first position and a second position. A retention feature is coupled to the bracket and is configured to engage with the base if the bracket is in the second position to retain the bracket in the second position. An electronic device is operable between an unassembled position and an assembled position in which the electronic device is engaged with the bracket. The electronic device is configured to move with the bracket as the bracket pivots between the first and second positions if the electronic device is in the assembled position.

Embodiments of the first aspect of the present disclosure can include any one or a combination of the following features:
- the electronic device includes an antenna;
- the bracket is integrally coupled with the base and is configured to pivot relative to the base via a living hinge;
- the base includes a floor and a pocket that extends cup holder assembly-downward from the floor to a distal end portion, and the bracket is pivotably coupled to the base via the living hinge proximate the distal end portion of the pocket;
- the pocket defines a cutout, at least a portion of which is proximate to the distal end portion of the pocket, and the bracket is configured to at least partially cover the cutout if the bracket is in the second position;
- the floor defines an aperture generally proximate to a position of the retention feature if the retention feature is engaged with the base; and
- the pocket is configured to receive a key fob that is configured to communicate with the electronic device.

According to a second aspect of the present disclosure, a cup holder assembly includes a base coupled to a side wall to define a cavity and a bracket pivotably coupled to the base and configured for engagement with an electronic device.

Embodiments of the second aspect of the present disclosure can include any one or a combination of the following features:
- the electronic device includes an antenna;
- the bracket is integrally coupled with the base and is configured to pivot relative to the base via a living hinge;
- the bracket is operable to pivot from a first position to a second position that is cup holder assembly-upward of the first position;
- a retention feature coupled to the bracket and configured to be engaged with the base if the bracket is in the second position to retain the bracket in the second position;
- the base includes a floor and a pocket that extends cup holder assembly-downward from the floor to a distal end portion, wherein the bracket is pivotably coupled to the base proximate to the distal end portion of the pocket; and
- the pocket defines a cutout, at least a portion of which is proximate to the distal end portion of the pocket, wherein the bracket is configured to cover the cutout if the bracket is in the second position.

According to a third aspect of the present disclosure, a cup holder assembly includes a base. The base includes a floor and a pocket that extends cup holder assembly-downward from the floor to a distal end portion. The pocket defines a cutout. A bracket is pivotably coupled to the pocket proximate the distal end portion and is operable to pivot from a first position to a second position. The bracket is configured to cover at least a portion of the cutout if the bracket is in the second position.

Embodiments of a third aspect of the present disclosure can include any one or a combination of the following features:
- the bracket is pivotably coupled to the pocket via a living hinge;
- a retention feature coupled to the bracket and configured to retain the bracket in the second position;
- a position of the retention feature if the bracket is in the first position is cup holder assembly-downward of the position of the retention feature if the bracket is in the second position;
- the floor defines an aperture generally proximate to the position of the retention feature if the bracket is in the second position; and
- the pocket includes a side portion extending between the floor and the distal end portion, wherein the cutout is at least partially defined by the side portion.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
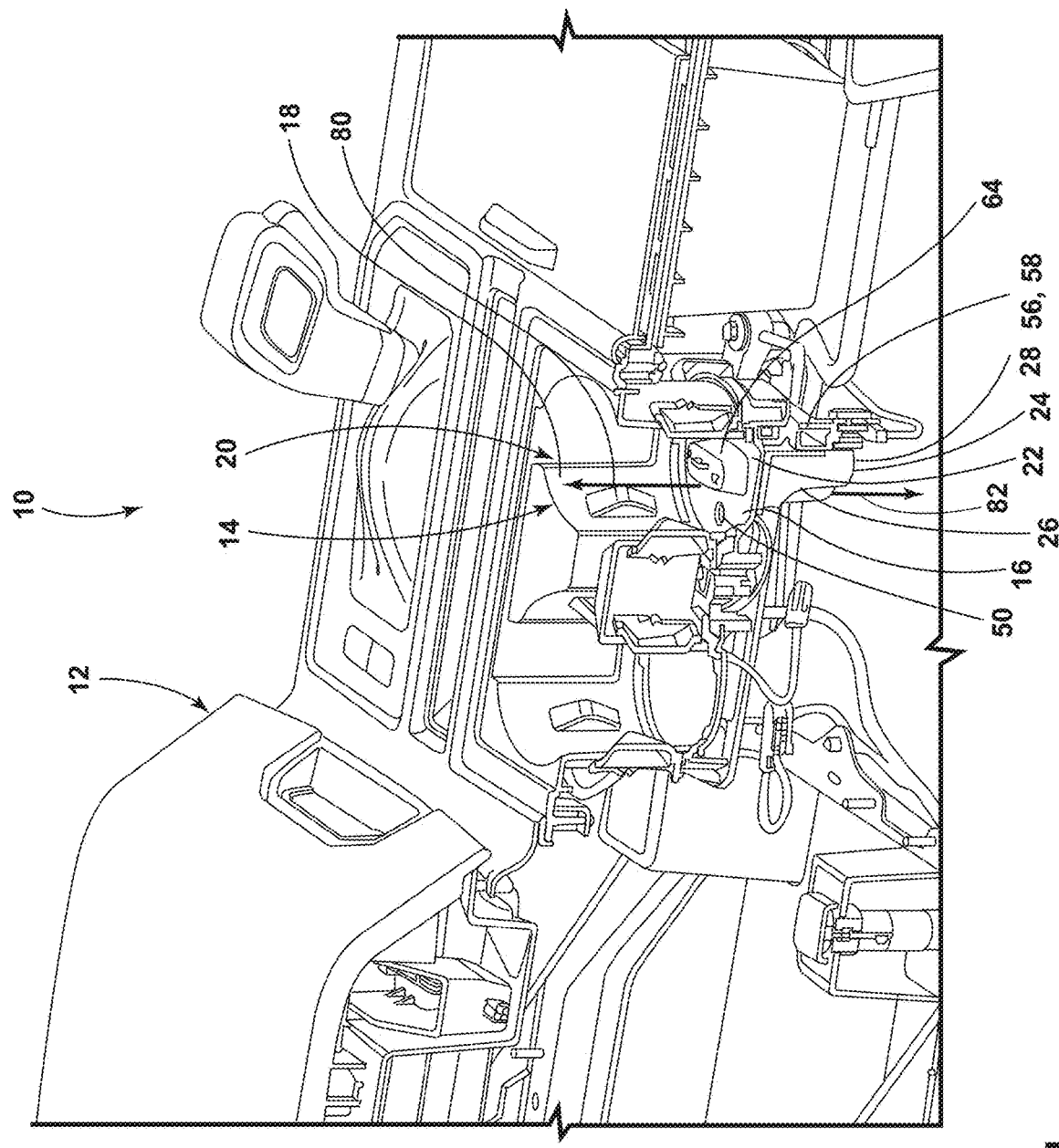
FIG. 1 is a perspective view of a vehicle, illustrating a cup holder assembly disposed within the vehicle, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-4B, a cup holder assembly 14 includes a base 16. A side wall 18 is coupled to the base 16 and extends from the base 16 to generally define a cavity 20 for receiving a cup. A bracket 32 is pivotably coupled to the base 16 and is operable to pivot between a first position 90 and a second position 92. A retention feature 46 is coupled to the bracket 32 and is configured to engage with the base 16 if the bracket 32 is in the second position 92 to retain the bracket 32 in the second position 92. An electronic device 56 is operable between an unassembled position 100 and an assembled position 102, in which the electronic device 56 is engaged with the bracket 32. The electronic device 56 is configured to move with the bracket 32 as the bracket 32 pivots between the first and second positions 90, 92 if the electronic device 56 is in the assembled position 102.

As used herein, the terms "cup holder assembly-upward" and "cup holder assembly-downward" are intended as directional descriptors that use the cup holder assembly 14 as a frame of reference. As such, the "cup holder assembly-upward" and "cup holder assembly-downward" directions move with the cup holder assembly 14 as the orientation of the cup holder assembly 14 changes but do not change relative to the cup holder assembly 14. As illustrated in FIGS. 1 and 3A-4B, an arrow that generally designates the "cup holder assembly-upward" direction is denoted by reference numeral "80," and an arrow that generally designates the "cup holder assembly-downward" direction is denoted by reference numeral "82."

Referring now to FIG. 1, a vehicle 10 includes a vehicle interior 12. The cup holder assembly 14 may be disposed within the vehicle interior 12. For example, in various embodiments, the cup holder assembly 14 may be disposed within a center console of the vehicle 10. It is contemplated that the cup holder assembly 14 may be disposed in various positions throughout the vehicle interior 12 and, further, that the cup holder assembly 14 may be used in non-vehicle applications.

Figure 2A:
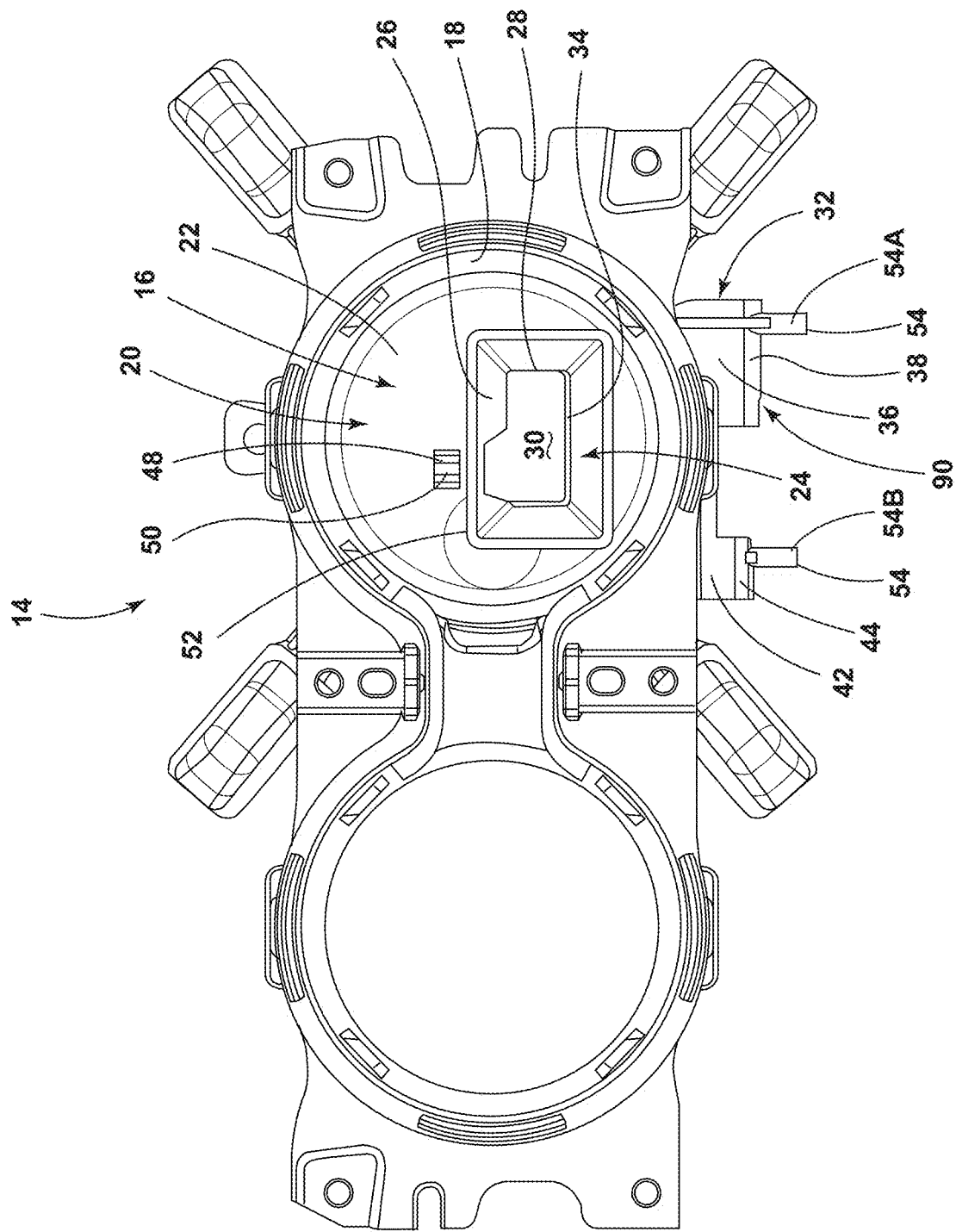
FIG. 2A is a top view of the cup holder assembly, illustrating a cup holder assembly base, that includes a floor and a pocket, and a bracket coupled to the base in a first position, according to one embodiment.
Figure 2B:
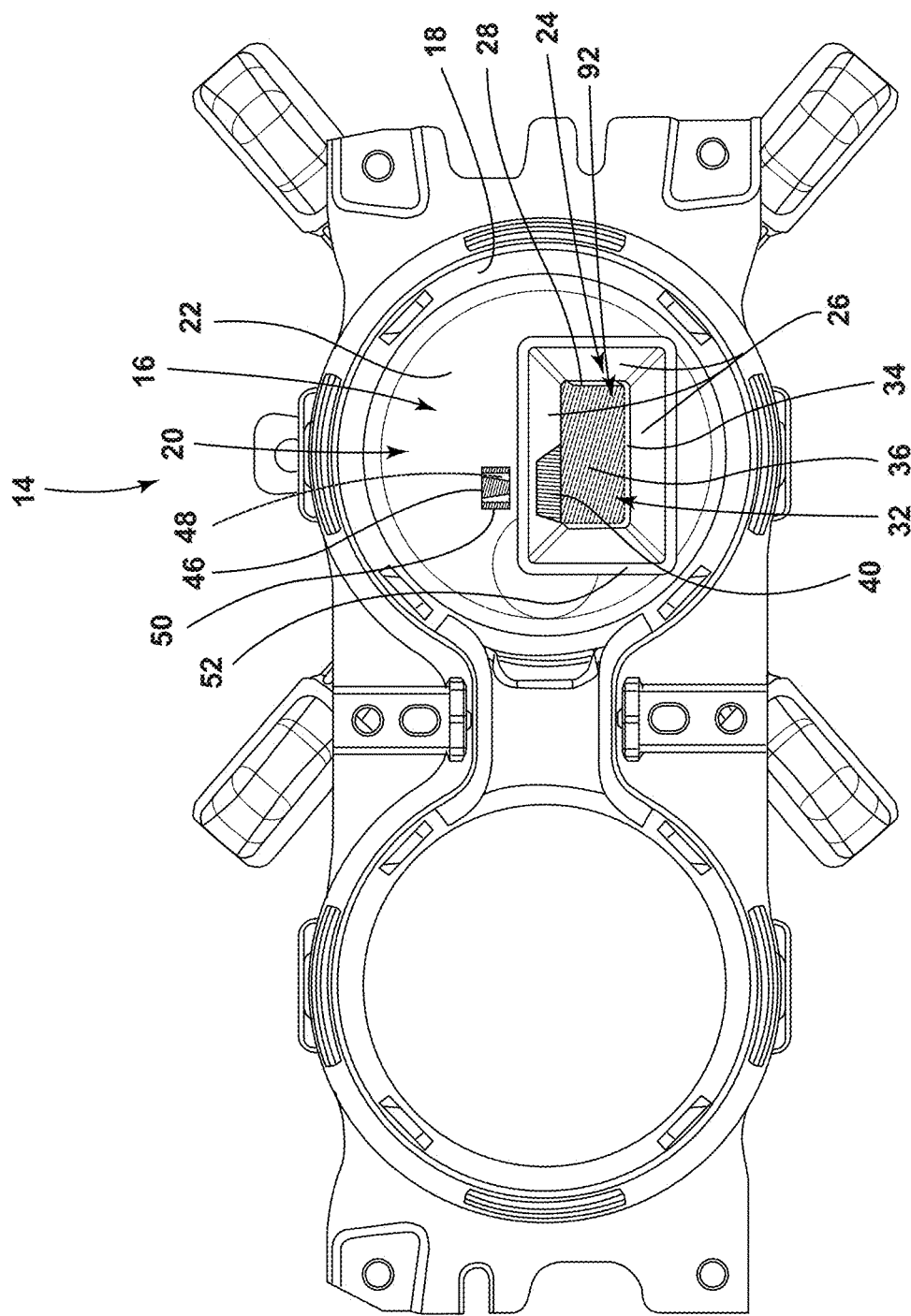
FIG. 2B is a top view of the cup holder assembly, illustrating the bracket coupled to the base in a second position, according to one embodiment.
Figure 3A:
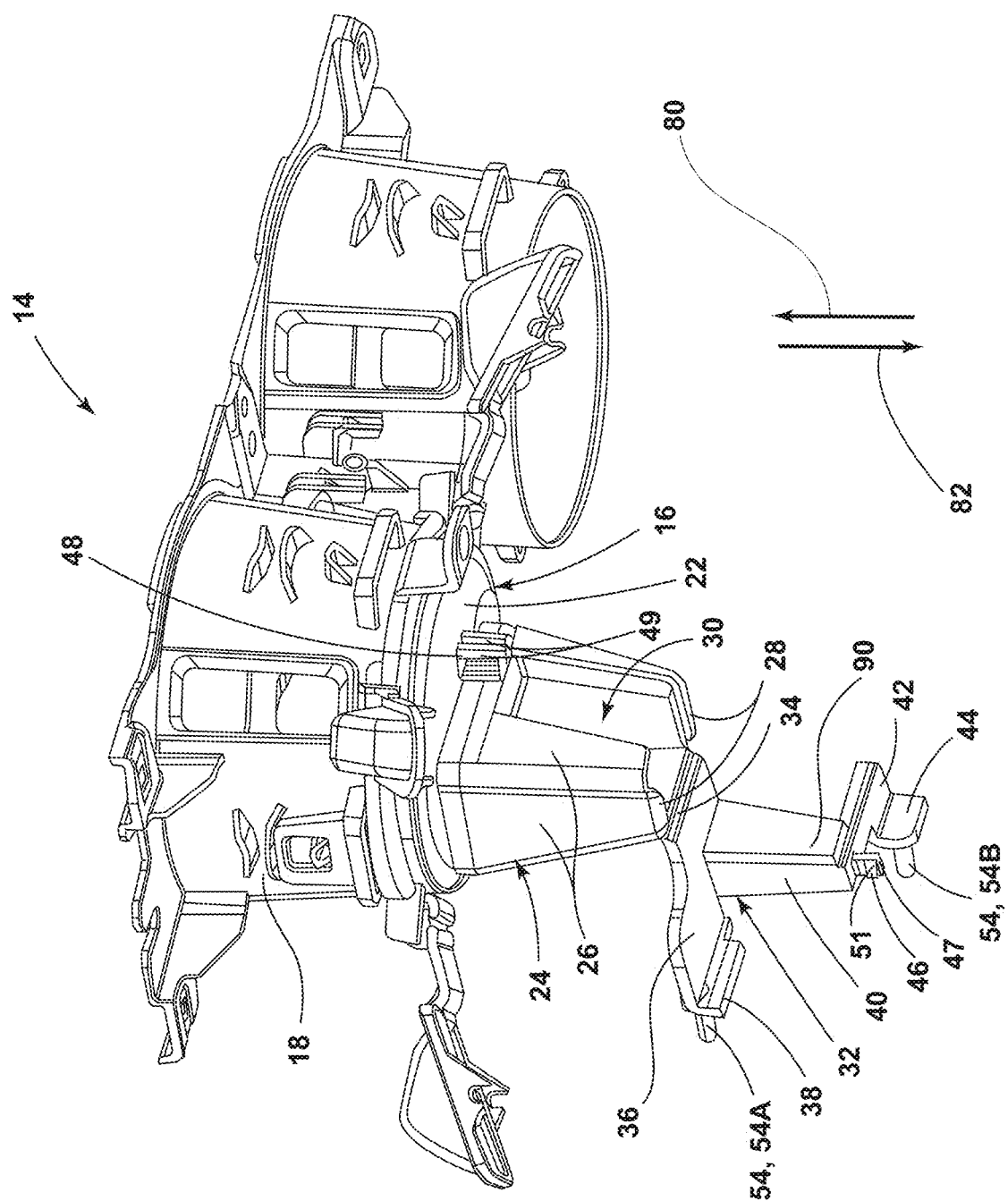
FIG. 3A is a lower elevational view of the cup holder assembly, illustrating the bracket coupled to the base in the first position, according to one embodiment.
Figure 3B:
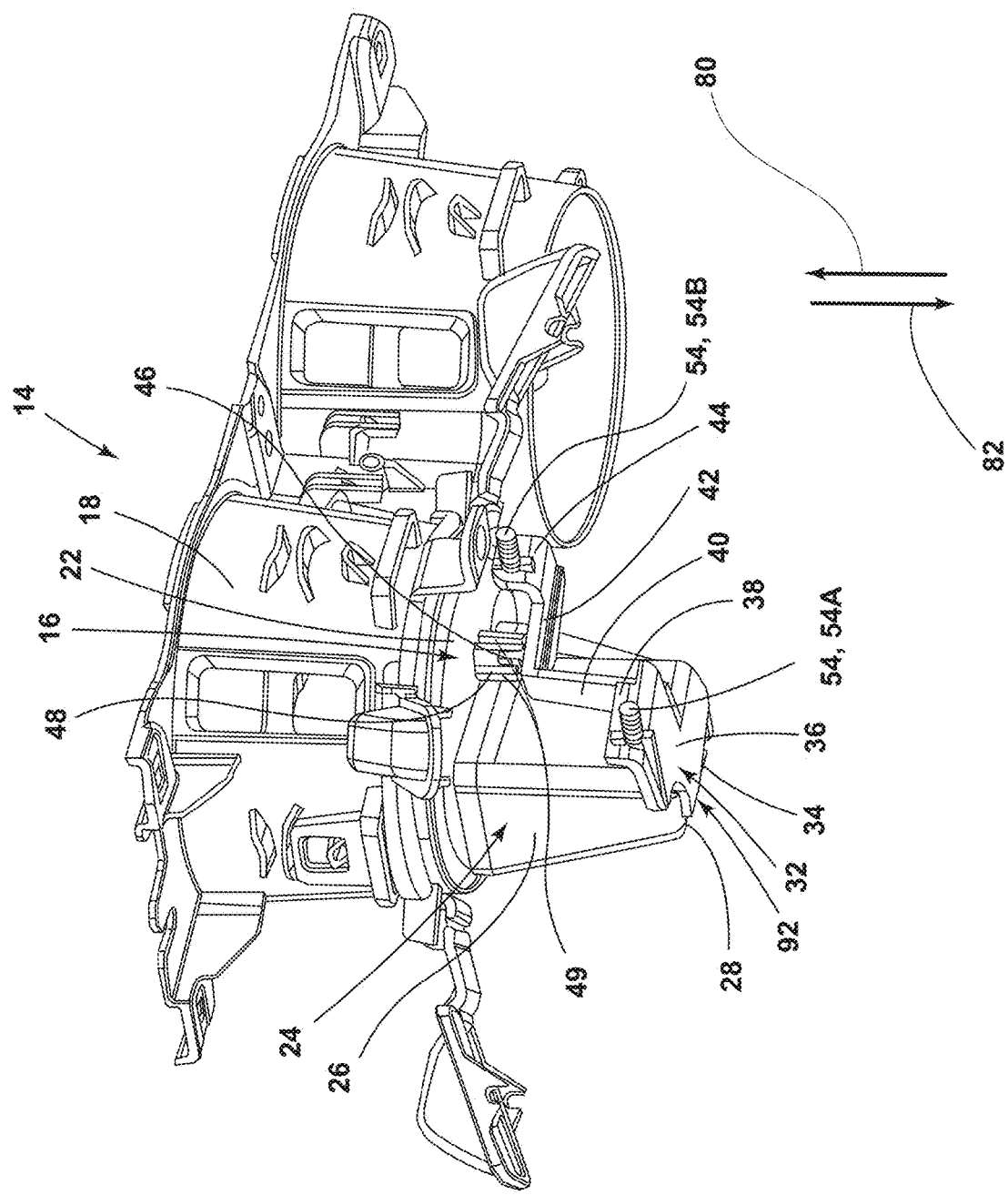
FIG. 3B is a lower elevational view of the cup holder assembly, illustrating the bracket coupled to the base in the second position, according to one embodiment.

Referring now to FIGS. 2A-3B, the base 16 of the cup holder assembly 14 is illustrated. The side wall 18 may be coupled to the base 16 and may extend cup holder assembly-upward from the base 16 to generally define a cavity 20 for receiving a cup. In various embodiments, the base 16 may generally form a bottom structure of the cup-receiving cavity 20, and the side wall 18 may generally form a side structure of the cup-receiving cavity 20. It is contemplated that an insert or other feature may be disposed within the cavity 20 defined by the base 16 and the side wall 18 if the cup holder assembly 14 is in a fully assembled condition. It is further contemplated that the side wall 18 and/or the base 16 of the cup holder assembly 14 may generally define a plurality of cup-receiving cavities 20. For example, as shown in FIGS. 3A and 3B, the side wall 18 is a single component that forms the side structures of first and second cup-receiving cavities 20 that are adjacent to each other. In some embodiments, the base 16 and the side wall 18 of the cup holder assembly 14 may be integrally coupled to each other, such that the base 16 and side wall 18 are a single unitary body. In some embodiments, the base 16 and the side wall 18 may be separate components that are coupled to each other, as shown in FIGS. 2A-4B.

Referring now to FIGS. 2A-3B, the base 16 may include a floor 22. In some embodiments, the base 16 may include a pocket 24 that extends cup holder assembly-downward from the floor 22. The pocket 24 may include a side portion 26 that extends cup holder assembly-downward from the floor 22 to a distal end portion 28 of the pocket 24. The distal end portion 28 of the pocket 24 may be distanced from the floor 22 of the base 16, such that the side portion 26 of the pocket 24 is disposed between the floor 22 of the base 16 and the distal end portion 28 of the pocket 24. As shown in FIGS. 2A and 3A, in various embodiments, the pocket 24 may define a cutout 30. In some embodiments, at least a portion of the cutout 30 may be disposed proximate to the distal end portion 28 of the pocket 24. In some embodiments, the cutout 30 may be at least partially defined by the distal end portion 28. In some embodiments, the cutout 30 may be at least partially defined by the side portion 26 of the pocket 24, as illustrated in FIGS. 2A and 3A.

Referring still to FIGS. 2A-3B, the cup holder assembly 14 may include the bracket 32. The bracket 32 may be pivotably coupled to the base 16 and configured to pivot between a first position 90 (illustrated in FIGS. 2A and 3A) and a second position 92 (illustrated in FIGS. 2B and 3B). As shown in FIGS. 3A and 3B, in some embodiments, the position of the bracket 32 in the second position 92 may be generally cup holder assembly-upward of the position of the bracket 32 in the first position 90. In various embodiments, the bracket 32 may be pivotably coupled to the pocket 24 of the base 16. In some embodiments, the bracket 32 may be pivotably coupled to the pocket 24 proximate to the distal end portion 28 of the pocket 24. In some embodiments, the bracket 32 may be pivotably coupled to the pocket 24 proximate to a portion of the cutout 30 defined by the pocket 24 that is proximate to the distal end portion 28 of the pocket 24.

As illustrated in FIGS. 3A and 3B, in various embodiments, the bracket 32 may be coupled to the base 16 via a living hinge 34. For example, as illustrated in FIG. 3A, the bracket 32 may be integrally coupled with the base 16 proximate to the distal end portion 28 of the pocket 24 via the living hinge 34, and may be configured to pivot relative to the base 16 via the living hinge 34.

In the embodiment illustrated in FIGS. 2A-3B, the bracket 32 includes a platform 36 that extends generally away from the living hinge 34. At least a portion of the platform 36 may cover the portion of the cutout 30 defined by the pocket 24 proximate to the distal end portion 28 of the pocket 24 if the bracket 32 is in the second position 92, as illustrated in FIGS. 2B and 3B. As illustrated, the cutout-covering portion of the platform 36 may function as a bottom of the pocket 24 if the bracket 32 is in the second position 92. A portion of the platform 36 may extend outward beyond the cutout-covering portion to an end that is distal relative to the living hinge 34. The platform 36 may include a first tang 38 disposed proximate to the distal end of the platform 36 relative to the living hinge 34 that couples the bracket 32 to the pocket 24. Using the second position 92 of the bracket 32, as shown in FIG. 3B, as a directional frame of reference, the first tang 38 may extend upward from the platform 36, as illustrated.

Still using the second position 92 of the bracket 32 as a directional frame of reference, a stanchion feature 40 may extend generally upward from the platform 36. The stanchion feature 40 may extend generally upward from a portion of the platform 36 that is disposed generally between the living hinge 34 and the first tang 38. As illustrated in FIGS. 2B and 3B, at least a portion of the stanchion feature 40 may cover a portion of the cutout 30 defined by the side portion 26 of the pocket 24 if the bracket 32 is in the second position 92. As such, the cutout-covering portion of the stanchion feature 40 may function as a side wall of the pocket 24, similar to the side portion 26 of the pocket 24, if the bracket 32 is in the second position 92, as depicted in FIGS. 2B and 3B. As shown in FIG. 3B, the stanchion feature 40 generally nests within the portion of the cutout 30 defined by the side portion 26, such that at least a portion of the stanchion feature 40 is generally, substantially, and/or entirely planar with the adjacent side portion 26.

A shelf 42 may be coupled to the stanchion feature 40 and may extend outward from the stanchion feature 40. As illustrated in FIG. 3B, the shelf 42 may extend outward from a portion of the stanchion feature 40 that is distal from the platform 36. Thus, the stanchion feature 40 may extend between the platform 36 and the shelf 42. The shelf 42 may include a second tang 44 that extends generally upward from the shelf 42 if the bracket 32 is in the second position 92. In the illustrated embodiment, the second tang 44 extends generally upward from a portion of the shelf 42 that is distal from the attached stanchion feature 40 and opposite the pocket 24, such that the shelf 42 is disposed between the pocket 24 and the second tang 44. It is contemplated that the bracket 32 may be structured in at least one of a variety of ways and, further, that the bracket 32 may include a variety of other components and/or omit above-described components in some embodiments.

Referring still to FIGS. 2A-3B, in various embodiments, the cup holder assembly 14 may include the retention feature 46. The retention feature 46 may be configured to retain the bracket 32 in the second position 92. In some embodiments, the retention feature 46 may be coupled to the bracket 32. In some embodiments, the retention feature 46 may be coupled to the bracket 32, such that the retention feature 46 is disposed generally proximate to the floor 22 of the base 16 if the bracket 32 is in the second position 92. For example, in the embodiment illustrated in FIG. 3B, the retention feature 46 is coupled to the shelf 42 of the bracket 32 and extends generally upward therefrom. In some embodiments, the position of the retention feature 46 if the bracket 32 is in the first position 90 may be cup holder assembly-downward of the position of the retention feature 46 if the bracket 32 is in the second position 92. The retention feature 46 may be configured to be engaged with the base 16 of the cup holder assembly 14 if the bracket 32 is in the second position 92. In various examples, pivoting the bracket 32 from the first position 90 to the second position 92 causes the retention feature 46 to become engaged with the base 16. The engagement between the retention feature 46 and the base 16 of the cup holder assembly 14 is configured to retain the bracket 32 in the second position 92, as shown in FIGS. 2B and 3B.

In the exemplary embodiment illustrated in FIG. 3B, the retention feature 46 is configured to be engaged with the base 16 via engagement with a corresponding attachment feature 48. The corresponding attachment feature 48 is configured to receive and engage with the retention feature 46, such that the bracket 32 may be held in the second position 92 via the retention feature 46. In the illustrated embodiment, the corresponding attachment feature 48 includes two arms 49, both being coupled to an underside of the floor 22 of the base 16 at one end and a portion of the pocket 24 disposed proximate to the floor 22 at another end. The arms 49 are in a spaced relationship with relative to each other, such that a void exists between the arms 49. As shown in FIG. 3A, the retention feature 46 includes a protrusion 47 that extends outward from the shelf 42 and includes at least one angled wing 51 at a distal end of the protrusion 47 relative to the shelf 42. The protrusion 47 is configured to be received into the void between the arms 49 of the attachment feature 48, and the at least one wing 51 is configured to catch on at least one of the arms 49 to retain the retention feature 46 in engagement with the attachment feature 48 (and the bracket 32 in the second position 92). It is contemplated that, in various embodiments, the bracket 32 may include one or more retention features 46 and that the one or more retention features 46 may be disposed in various positions on the bracket 32. Further, it is contemplated that the retention feature 46 may be one or more of a variety of features configured to retain the bracket 32 in the second position 92 (e.g., snap fit, magnetic fasteners, etc.).

Referring now to FIGS. 2A and 2B, in various embodiments, the floor 22 of the base 16 may define an aperture 50. The aperture 50 may be disposed generally proximate to an outer periphery 52 of the pocket 24. In various embodiments, the aperture 50 may be generally proximate to the position of the retention feature 46 if the bracket 32 is in the second position 92. For example, as shown in FIGS. 2A and 2B, the aperture 50 is defined by the floor 22 proximate to the portion of the floor 22 coupled to the attachment feature 48. As such, if the bracket 32 is pivoted from the first position 90, as shown in FIG. 2A, to the second position 92, as shown in FIG. 2B, the retention feature 46 may be proximate with the aperture 50 as the retention feature 46 engages with the attachment feature 48. The aperture 50 may provide access to the retention feature 46 through the floor 22 of the base 16, which may aid in disengaging the retention feature 46 from the base 16 to allow the bracket 32 to pivot from the second position 92 back to the first position 90.

Figure 4A:
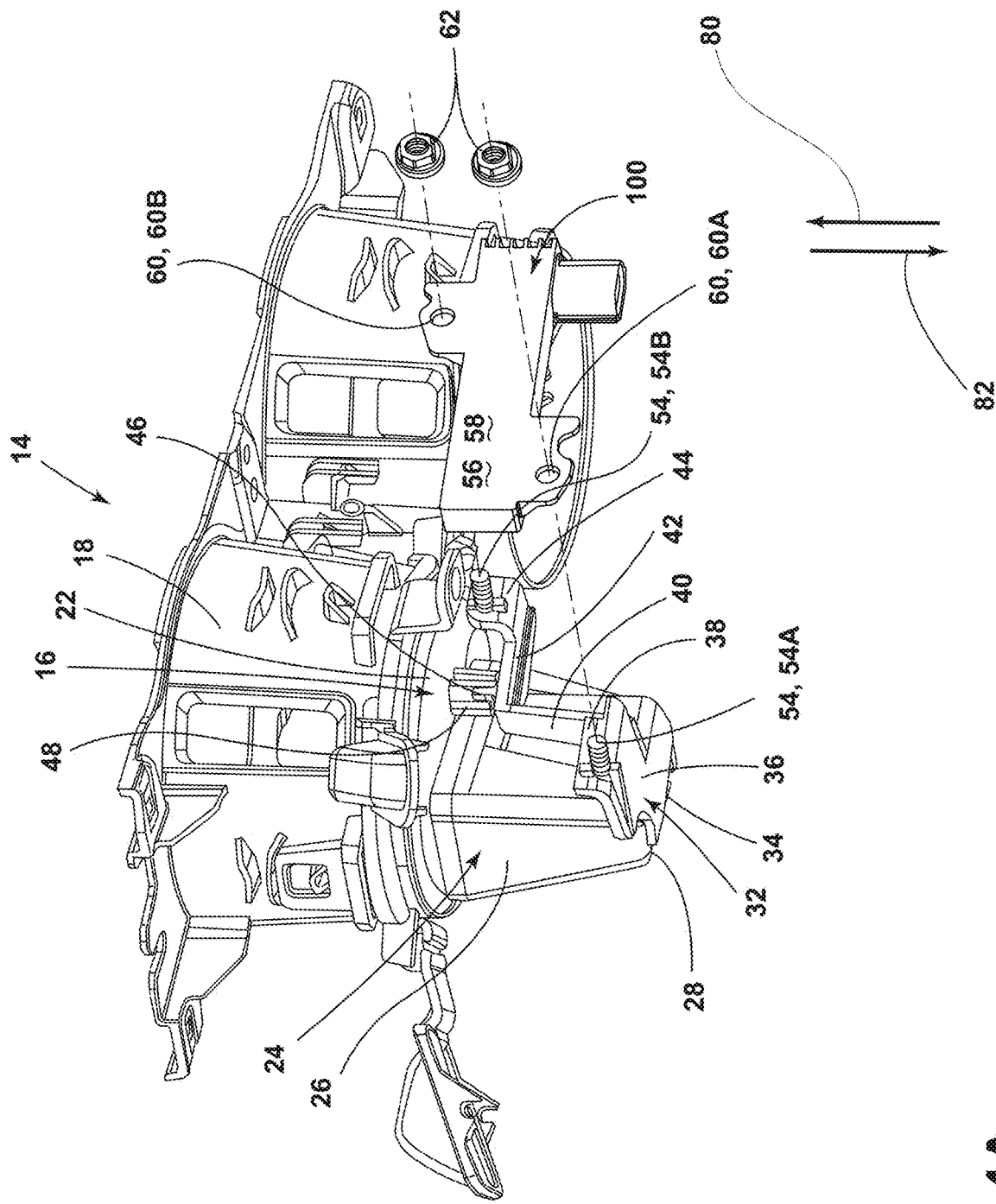
FIG. 4A is a lower elevational view of the cup holder assembly, illustrating the bracket in the second position and an electronic device disengaged with the engagement features of the bracket, such that the electronic device is in an unassembled position, according to one embodiment.
Figure 4B:
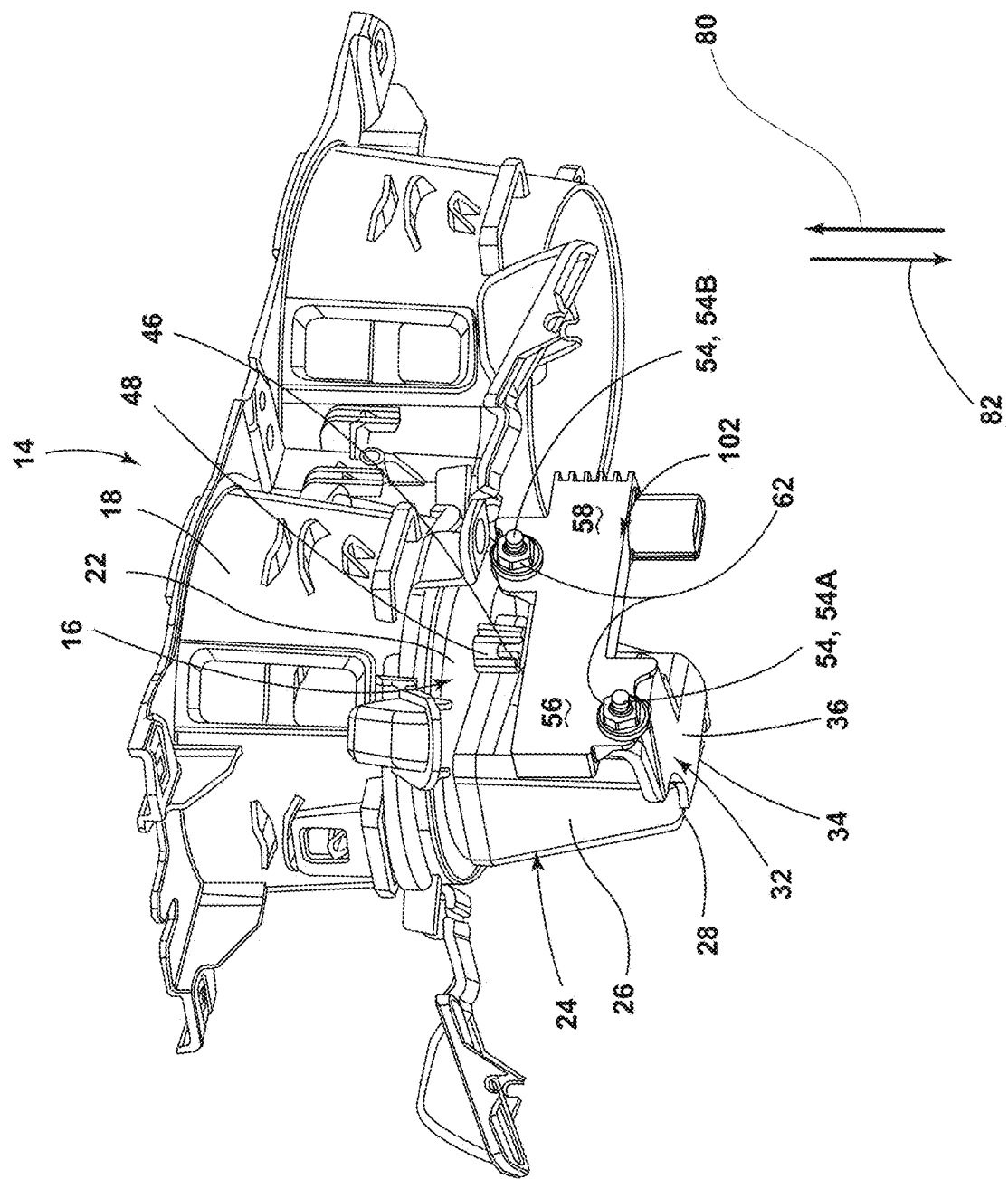
FIG. 4B is a lower elevational view of the cup holder assembly, illustrating the bracket in the second position and the electronic device engaged with the engagement features of the bracket, such that the electronic device is in an assembled position, according to one embodiment.

Referring now to FIGS. 3A-4B, in various embodiments, the bracket 32 may include at least one engagement feature 54. The at least one engagement feature 54 may be configured to be engaged with the electronic device 56 to maintain the electronic device 56 in engagement with the bracket 32, as shown in FIG. 4B. In some embodiments, the bracket 32 may include a plurality of engagement features 54. For example, in the embodiment illustrated in FIGS. 3A and 3B, the bracket 32 includes a first engagement feature 54A and a second engagement feature 54B. As illustrated, the first and second engagement features 54A, 54B may protrude outward from the first and second tangs 38, 44, respectively, and may be configured to matingly engage with corresponding receiving features 60 of the electronic device 56. The illustrated first and second engagement features 54A and 54B are threaded, cylindrical, protrusions extending outward from the first and second tangs 38, 44, respectively. It is contemplated that, in various embodiments, the at least one engagement feature 54 may include one or more of a variety of features configured to engage with the component configured to be retained by the bracket 32. It is contemplated that, in various embodiments, the at least one engagement feature 54 may be disposed in various positions on the bracket 32. Further, it is contemplated that the engagement feature 54 may be one or more of a variety of features configured to be engaged with the electronic device 56 (e.g., snap fit, magnetic fasteners, etc.).

Referring now to FIGS. 4A and 4B, in various embodiments, the cup holder assembly 14 may include the electronic device 56. In various embodiments, the electronic device 56 may include an antenna 58. In some examples, the antenna 58 may be configured to communicate with a remote device for a keyless vehicle entry system and/or another vehicle system. In various embodiments, the electronic device 56 may include the one or more receiving features 60. For example, as illustrated in FIG. 4A, the antenna 58 includes first and second receiving features 60A, 60B in the form of apertures.

Referring still to FIGS. 4A and 4B, in various embodiments, the electronic device 56 may be operable between an unassembled position 100, as shown in FIG. 4A, and an assembled position 102, as shown in FIG. 4B. The electronic device 56 may be disengaged from the bracket 32 while in the unassembled position 100. For example, in the embodiment illustrated in FIG. 4A, the electronic device 56 is shown in a position distanced from the bracket 32, such that the electronic device 56 is not engaged with the bracket 32 and is not being retained in assembly with the cup holder assembly 14 by the bracket 32.

As depicted in FIG. 4B, the electronic device 56 may be engaged with the bracket 32 if in the assembled position 102. In various embodiments, the electronic device 56 may be engaged with the bracket 32 to generally retain the electronic device 56 in assembly with the cup holder assembly 14 in one or more of a variety of ways. For example, in the embodiment illustrated in FIG. 4B, the electronic device 56 is depicted in the assembled position 102, wherein the electronic device 56 is engaged with the bracket 32 via engagement of the first and second engagement features 54A, 54B of the bracket 32 with the corresponding receiving features 60. The embodiment depicted in FIG. 4B includes nuts 62 retaining the receiving features 60 in mating-engagement with the threaded, cylindrical engagement features 54 of the bracket 32; however, as discussed above, a variety of features may be utilized to keep the bracket 32 and the antenna 58 in engagement with each other. For example, the one or more engagement features 54 coupled to the bracket 32 may include snap-fit protrusions configured to engage with the receiving features 60 of the electronic device 56 and remain in engagement without nuts 62, in some embodiments.

If the electronic device 56 is in the assembled position 102 the electronic device 56 may be configured to move with the bracket 32 as the bracket 32 pivots between the first and second positions 90, 92. In some embodiments, the bracket 32 may be configured to cover at least a portion of the cutout 30 defined by the pocket 24 if the bracket 32 is in the second position 92. In some embodiments, the bracket 32 may be configured to partially, substantially, and/or entirely cover the cutout 30 if the bracket 32 is in the second position 92. For example, in the embodiment illustrated in FIGS. 2A-3B, portions of the platform 36 and stanchion feature 40 may be configured to cover the portions of the cutout 30 defined by the distal end portion 28 of the pocket 24 and the side portion 26 of the pocket 24, respectively, if the bracket 32 is in the second position 92. As illustrated in FIG. 2B, in some embodiments, by covering the cutout 30 defined by the pocket 24, the bracket 32 may make the pocket 24 generally suitable for receiving an object therein. In some embodiments, the pocket 24 may be configured to receive, for example, a key fob 64 if the bracket 32 is generally covering the cutout 30 if in the second position 92. The key fob 68 is illustrated in FIG. 1 as being disposed within the pocket 24. The key fob 64 may be configured for electrical communication with the electronic device 56. For example, the key fob 64 may be configured to communicate with the antenna 58, in some embodiments. Placement of the key fob 64 into the pocket 24 may position the key fob 64 in close proximity with the antenna 58, which may allow for better communication between the key fob 64 and the antenna 58, particularly when the battery levels of the key fob 64 are low or completely depleted.

In operation of an exemplary embodiment, during assembly of the electronic device 56 with the cup holder assembly 14, the electronic device 56 may be moved from the unassembled position 100 to the assembled position 102 while the bracket 32 is in the first position 90 via engagement of the first and second engagement features 54A, 54B of the bracket 32 with the corresponding first and second receiving features 60A, 60B of the electronic device 56. Next, the bracket 32 and the electronic device 56 coupled thereto are pivoted from the first position 90 to the second position 92. Movement to the second position 92 causes the retention feature 46 to become engaged with the base 16, such that the bracket 32 is maintained in the second position 92.

The present disclosure may provide a variety of advantages. First, integrally forming the bracket 32 with the base 16 of the cup holder assembly 14 may reduce a number of parts necessary to attach the electronic device 56 to the cup holder assembly 14 and may, therefore, reduce the costs of the cup holder assembly 14. Second, the bracket 32 being configured to cover the cutout 30 defined by the pocket 24 if in the second position 92 may render the pocket 24 suitable to hold the key fob 64 for use in the keyless vehicle entry system. Third, the aperture 50 defined by the floor 22 of the base 16 and/or the cutout 30 defined by the pocket 24, may aid a user in moving the bracket 32 from the second position 92 to the first position 90. In particular, the aperture 50 may aid the user in moving the bracket 32 from the second position 92 to the first position 90 by allowing the user to access and disengage the retention feature 46 retaining the bracket 32 in the second position 92. Further, the cutout 30 may aid the user in moving the bracket 32 from the second position 92 to the first position 90 by allowing the user to access cutout-covering portions of the bracket 32 from within the pocket 34 and apply pressure to those portions to move the bracket 32 toward the first position 90. As such, the electronic device 56 may be conveniently assembled and positioned in the second position 92, and also may be moved from the second position 92 to the first position 90 and disassembled by a user.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cup holder assembly, comprising:
   a base;
   a side wall coupled to the base and extending cup holder assembly-upward from the base to define a cavity;
   a bracket pivotably coupled to the base and operable to pivot between a first position and a second position;
   a retention feature coupled to the bracket and configured to be engaged with the base if the bracket is in the second position to retain the bracket in the second position; and
   an electronic device operable between an unassembled position and an assembled position, wherein the electronic device is configured to move with the bracket as the bracket pivots between the first and second positions if the electronic device is in the assembled position.

2. The cup holder assembly of claim 1, wherein the electronic device comprises:
   an antenna.

3. The cup holder assembly of claim 1, wherein the bracket is integrally coupled with the base and is configured to pivot relative to the base via a living hinge.

4. The cup holder assembly of claim 3, wherein the base comprises:
   a floor; and
   a pocket that extends cup holder assembly-downward from the floor to a distal end portion, wherein the bracket is pivotably coupled to the base via the living hinge proximate to the distal end portion of the pocket.

5. The cup holder assembly of claim 4, wherein the pocket defines a cutout, at least a portion of which is proximate to the distal end portion of the pocket, and the bracket is configured to at least partially cover the cutout if the bracket is in the second position.

6. The cup holder assembly of claim 5, wherein the floor defines an aperture generally proximate to a position of the retention feature if the retention feature is engaged with the base.

7. The cup holder assembly of claim 5, wherein the pocket is configured to receive a key fob that is configured to communicate with the electronic device.

8. A cup holder assembly, comprising:
   a base having a floor and being coupled to a side wall to define a cavity; and
   a bracket pivotably coupled to the base cup holder assembly-downward of the floor and configured for engagement with an electronic device at a position cup holder assembly-downward of the floor, wherein the bracket is operable to pivot from a first position to a second position that is cup holder assembly-upward of the first position, and wherein the base further comprises:
      a pocket that extends cup holder assembly-downward from the floor to a distal end portion, wherein the bracket is pivotably coupled to the base proximate to the distal end portion of the pocket.

9. The cup holder assembly of claim 8, wherein the electronic device comprises:
   an antenna.

10. The cup holder assembly of claim 8, wherein the bracket is integrally coupled with the base and is configured to pivot relative to the base via a living hinge.

11. The cup holder assembly of claim 8, further comprising:
    a retention feature coupled to the bracket and configured to be engaged with the base if the bracket is in the second position to retain the bracket in the second position.

12. The cup holder assembly of claim 8, wherein the pocket defines a cutout, at least a portion of which is proximate to the distal end portion of the pocket, wherein the bracket is configured to cover the cutout if the bracket is in the second position.

13. A cup holder assembly, comprising:
    a base, comprising:
       a floor; and
       a pocket that extends cup holder assembly-downward from the floor to a distal end portion and defines a cutout; and
    a bracket pivotably coupled to the pocket proximate the distal end portion and operable to pivot from a first position to a second position, wherein the bracket is configured to cover at least a portion of the cutout if the bracket is in the second position.

14. The cup holder assembly of claim 13, wherein the bracket is pivotably coupled to the pocket via a living hinge.

15. The cup holder assembly of claim 13, further comprising:
    a retention feature coupled to the bracket and configured to retain the bracket in the second position.

16. The cup holder assembly of claim 15, wherein a position of the retention feature if the bracket is in the first position is cup holder assembly-downward of the position of the retention feature if the bracket is in the second position.

17. The cup holder assembly of claim 15, wherein the floor defines an aperture generally proximate to the position of the retention feature if the bracket is in the second position.

18. The cup holder assembly of claim 13, wherein the pocket comprises:
 a side portion extending between the floor and the distal end portion, wherein the cutout is at least partially defined by the side portion.

\* \* \* \* \*